United States Patent
Matarrita Sequeira

(10) Patent No.: US 12,143,037 B2
(45) Date of Patent: Nov. 12, 2024

(54) ADAPTIVE CONTROL FOR SYNCHRONOUS DOWNHOLE MOTORS

(71) Applicant: Baker Hughes Oilfield Operations, LLC, Houston, TX (US)

(72) Inventor: Aider Matarrita Sequeira, Signal Hill, CA (US)

(*) Notice: Subject to any disclaimer, the term of this patent is extended or adjusted under 35 U.S.C. 154(b) by 360 days.

(21) Appl. No.: 17/525,820

(22) Filed: Nov. 12, 2021

(65) Prior Publication Data
US 2023/0151817 A1   May 18, 2023

(51) Int. Cl.
| | |
|---|---|
| *H02P 21/00* | (2016.01) |
| *E21B 41/00* | (2006.01) |
| *E21B 43/12* | (2006.01) |
| *F04D 13/10* | (2006.01) |
| *H02P 23/14* | (2006.01) |

(52) U.S. Cl.
CPC .......... *H02P 21/00* (2013.01); *E21B 41/0085* (2013.01); *E21B 43/128* (2013.01); *F04D 13/10* (2013.01); *H02P 23/14* (2013.01)

(58) Field of Classification Search
CPC ...... H02J 7/00714; H02J 7/0063; H02J 7/345; H02J 2207/20; H02J 2310/48; H02P 23/30; H02P 2207/01; B60L 50/60; B60L 50/51; B60L 15/20; B60L 2200/26; B60L 2210/40; B61C 3/00

See application file for complete search history.

(56) References Cited

U.S. PATENT DOCUMENTS

| | | | |
|---|---|---|---|
| 2009/0044938 A1* | 2/2009 | Crossley ............ | G05B 23/0243 166/250.15 |
| 2010/0155057 A1* | 6/2010 | Atherton ............... | G01R 29/16 166/250.01 |
| 2016/0215601 A1 | 7/2016 | Knapp | |
| 2018/0254728 A1* | 9/2018 | Ademoye ............. | E21B 43/128 |
| 2018/0375456 A1* | 12/2018 | Huh ...................... | E21B 43/128 |

OTHER PUBLICATIONS

International Search Report and Written Opinion for International Patent Application No. PCT/US2022/079727, mailed Mar. 24, 2023, 11 pgs.

* cited by examiner

*Primary Examiner* — Zoheb S Imtiaz
(74) *Attorney, Agent, or Firm* — Baker Hughes Company

(57) ABSTRACT

Systems and methods for adjusting the power provided by an electric drive system to an ESP motor through an electrical network based on a model of the system and real-time inputs indicating operating conditions of the system. Some embodiments use a field oriented control system to adjust a direct-axis current setting to generate output power signals which drives the motor at a desired operating point for optimized performance. The electrical network may include a filter, a transformer, and a transmission line. A drive controller may receive real-time operating conditions and motor parameters as input, and may select further system parameters based on the received parameters. The controller builds a model of the electrical network and generates adjustments to the power generated by the drive using the system model and received real-time input. The adjustments may be recalculated at scheduled intervals.

12 Claims, 4 Drawing Sheets

ADAPTIVE CONTROL FOR SYNCHRONOUS DOWNHOLE MOTORS

BACKGROUND

Field of the Invention

The invention relates generally to controlling motors, and more particularly to means for adapting the output of an electric drive system for an electric submersible pump (ESP) motor to compensate for variations in an electrical network between the drive system and the motor.

Related Art

Artificial lift systems such as ESPs are commonly used to pump fluids from wells. Typically, AC power from a grid is used to generate three-phase power at the surface of the well, and this power is transmitted over an electrical network that is connected to the motor of the ESP. The electrical network often includes not only transmission lines (which may be thousands of feet long), but also components such as filters, transformers, and the like.

Electric drive systems for motors are usually assumed to be directly connected to the motors. In other words, the electrical network between the drive in the motor is usually considered to have little or no effect on the output of the drive system, and it is assumed that the signals output by the drive system are received, unaltered, by the motor. When electrical components that have a non-negligible effect on the power are coupled between the drive system and the motor, however, the characteristics of the power received by the motor are not the same as the characteristics of the power at the output of the drive system. Consequently, the power output by a drive system which is coupled to the motor by an electrical network should be different than the power output by a drive system which is directly coupled to the motor. The difference depends not only on the specific components of the electrical network, but also on the operating conditions of the motor.

Therefore, in order to enable the drive system to produce output power which is adapted to drive a motor with optimized performance, the drive system should be configured to adjust its output to compensate for the effects of the electrical network over a range of operating conditions.

SUMMARY OF THE INVENTION

This disclosure is directed to systems and methods for adjusting the power output by an electric drive system based on a model of the system (including the motor and the electrical network between the electric drive system and the motor), as well as real time inputs indicating operating conditions of the system. Embodiments disclosed herein implement controls which use these inputs to adjust a direct axis current setting so that the drive system can generate output power signals which enable the motor to operate as closely as possible to a desired operating point (e.g., operating at the maximum torque-per-amp capability of the motor).

One embodiment comprises a system for controlling an electric submersible pump (ESP) motor. In some embodiments, the electric drive is installed at the surface of a well, and the ESP is installed downhole in the well, wherein the transmission line may be thousands of feet long. The system includes an ESP having an electric motor, an electric drive adapted to generate AC output power to drive the electric motor, and an electrical network coupled between the electric drive and the electric motor. In one embodiment, the electrical network includes a filter, a transformer, and a transmission line. The electric drive includes an output power generator which is adapted to receive external power from an external power source and to generate the AC output power to drive the ESP motor using the received external power. The electric drive also includes a controller adapted to maintain a model of the electrical network. The controller receives real-time data indicating current operating conditions of the electric motor and generates a power adjustment parameter based on the model of the electrical network and the received real-time data indicating the current operating conditions of the motor. The electric drive then provides the generated power adjustment parameter to the output power generator. In some embodiments, the drive controller may comprise a field oriented control system. This control system may generate a direct-axis current setting as the power adjustment parameter. The control system may include a scheduler which is adapted to cause the drive controller to recalculate the power adjustment parameter at scheduled intervals.

In some embodiments, the drive controller has an input interface adapted to receive user input defining one or more parameters of the electrical network. The system may also receive real-time information on operating conditions such as the current being drawn by the motor and the speed of the motor. In some embodiments, values for these conditions are determined by the electric drive. In other embodiments, the system may have one or more sensors (e.g., current sensors and/or motor speed sensors) adapted to monitor the one or more current operating conditions of the electric motor and generate real-time data indicating the current operating conditions. The sensors may then provide the generated real-time data to the drive controller.

In some embodiments, the drive controller may be adapted to receive user input indicating one or more parameters of the ESP system, where the drive controller builds the model of the electrical network based at least in part on the received user input. The received user input may include an identification of a motor parameter, where the drive controller is adapted to retrieve a table of electrical network parameters, look up the identification of the motor parameter in the table, and select a set of the electrical network parameters in the table corresponding to the identification of the motor parameter. The selected parameters can then be used to build the system model.

An alternative embodiment may comprise a method for generating output power to drive an ESP motor through an electrical network. This method includes receiving, by a controller of an electric drive, user input corresponding to one or more parameters of an ESP system in which an electric drive is coupled to an ESP motor through an electrical network including a filter and a transformer. The received user input may comprise an identification of a motor parameter, where the controller retrieves a table of electrical network parameters, looks up the identification of the motor parameter in the table, selects a set of the electrical network parameters in the table corresponding to the identification of the motor parameter. The controller of the electric drive then generates a system model based on the received user input and the selected set of the electrical network parameters and controls the electric drive to generate output power. The electric drive applies the output power to the electrical network to drive the ESP motor.

The method further includes sensing one or more operating conditions of the ESP motor, such as a motor speed of the ESP motor and sensing a current drawn by the ESP motor. The controller of the electric drive receives signals corresponding to the real-time operating conditions and generates an adjustment parameter based on the system model and the signals for the real-time operating conditions. The controller of the electric drive may be a field oriented control system which generates a direct-axis current setting as the power adjustment parameter. The controller of the electric drive then controls the drive to generate output power which is modified based on the adjustment parameter.

Numerous other embodiments are also possible.

BRIEF DESCRIPTION OF THE DRAWINGS

Other objects and advantages of the invention may become apparent upon reading the following detailed description and upon reference to the accompanying drawings.

Figure 1:
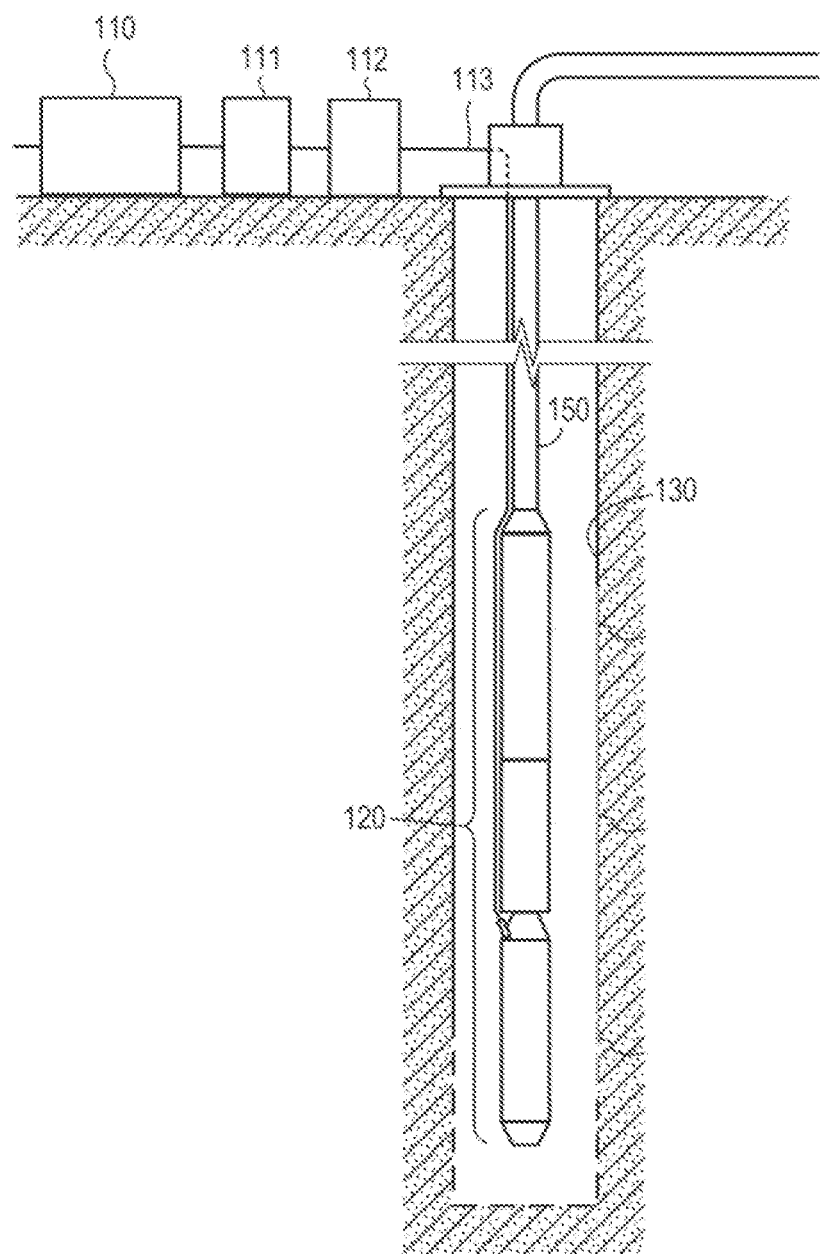
FIG. 1 is a diagram illustrating an exemplary pump system in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims. Further, the drawings may not be to scale, and may exaggerate one or more components in order to facilitate an understanding of the various features described herein.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for adapting the output generated by an electric drive system based on real-time operating conditions that are used in conjunction with a model of the system to determine an optimized output for the drive. In some embodiments, an electric drive is coupled to an ESP motor by an electrical network that includes a filter, a transformer, and transmission lines that may be thousands of feet long. The drive system receives input from a user defining several parameters of the system and stores this information for use in modeling the system. When the system is operated, the electric drive system monitors several real-time conditions and uses this information and the system model to generate adjustments to one or more power settings for generation of the output power that is provided to the electrical network to drive the ESP motor.

Referring to FIG. 1, a diagram illustrating an exemplary ESP system in accordance with one embodiment of the present invention is shown. An ESP system 120 is installed in a wellbore 130 in an oil-bearing geological structure. ESP system 120 is positioned in a producing region of the well where oil flows from the formation into the well. ESP system 120 is coupled to production tubing 150, through which the system pumps oil out of the well.

An electric drive system 110 is positioned at the surface of the well. Drive system 110 is coupled to ESP 120 by an electrical network which includes a filter 111, a transformer 112 and a transmission line 113 that runs down the wellbore along tubing string 150. The system may also include various electrical data lines that may carry various types of sensed data and control information between the downhole pump system and the surface control equipment. Alternatively, the ESP system may use "comms-on" communications in which sensed data and control information may be carried over the transmission lines that are used to carry power to the ESP motor.

Figure 2:
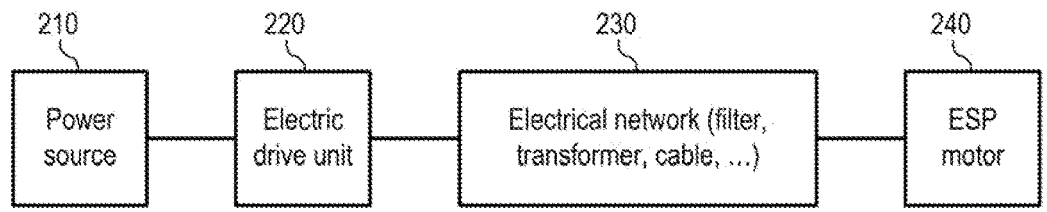
FIG. 2 is a functional block diagram illustrating the transmission of power to the ESP motor in accordance with one embodiment.

Referring to FIG. 2, a functional block diagram illustrating the transmission of power to the ESP motor is shown. As depicted in this figure, power is initially provided from a power source 210 to an electric drive unit 220. Power source 210 may comprise any suitable source of power, including AC or DC sources, power grids, generators, batteries, or the like. For example, power source 210 may be a power grid providing 480V, three-phase power. The power provided by source 210 is input to electric drive unit 220, which converts the input power to a form which is suitable to be provided to the ESP motor via electrical network 230.

In one embodiment, drive unit 220 generates a three-phase pulse width modulated (PWM) output signal. This signal is low-pass filtered by electrical network 230 to produce generally sinusoidal waveforms. The waveforms output by the filter are provided to a step-up transformer, which increases the voltage of the waveforms for transmission to the ESP motor over a transmission line. The transmission line conveys the voltage (minus resistive losses) to ESP motor 240.

The components of the electrical network can have significant impacts on the signals that are received by the ESP motor, and the effects of the components may change based on the operating conditions of the motor. The effect of the electrical network may depend on, for example, the current drawn by the motor and the motor speed.

Drive unit 220 implements controls that provide compensation for the effects of electrical network 230 on the power output by the drive unit. By doing so, the system enables the electric motor to operate as closely as possible to a desired operating point, such as the maximum torque-per-amp capability. This allows the motor to operate over a wide range of loads and speeds while maintaining high performance.

Figure 3:
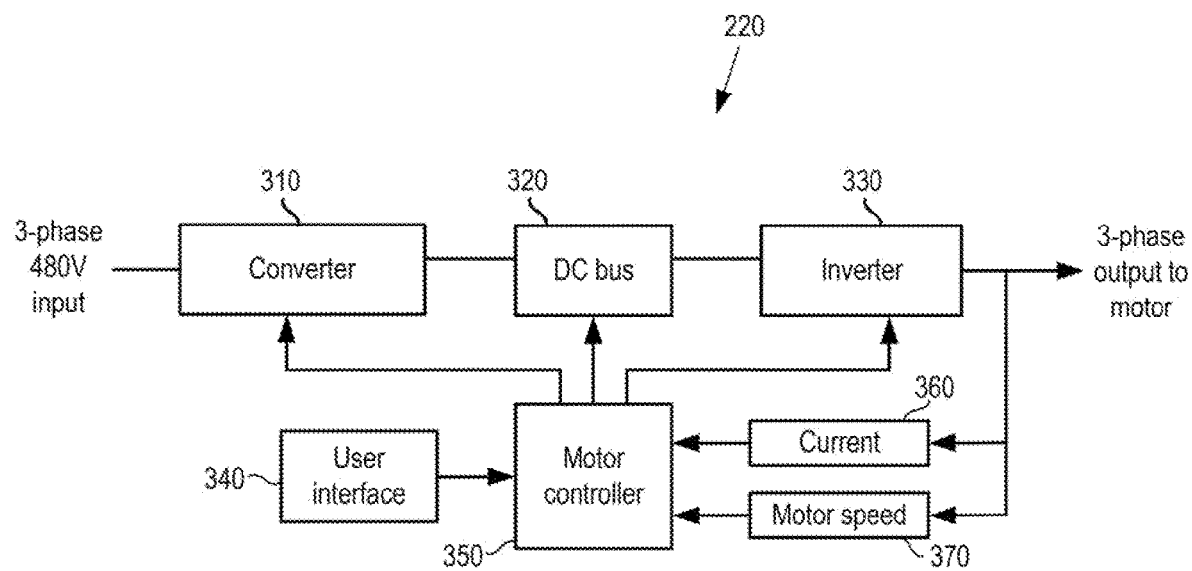
FIG. 3 is a functional block diagram illustrating the structure of a drive system for an electric motor in accordance with one embodiment.

In some embodiments, this compensation functionality is implemented in a control system of the electric drive for the ESP motor. The structure of an exemplary drive system is shown in FIG. 3. As depicted in this figure, drive system 220 has a variable AC/DC converter 310 that receives AC input power from an external power source.

The input power may be, for example, 480V, three-phase power. Converter 310 converts the received AC power to DC power and provides this power to a DC bus 320. The DC power on DC bus 320 is input to an inverter 330 which may use, for example, IGBT switches to produce three-phase output power at a desired voltage and frequency. In one embodiment, inverter 330 is configured to generate pulse width modulated (PWM) output waveforms. Other embodiments may generate six-step output waveforms or other waveforms that can be used to drive the ESP motor. As noted above with respect to FIG. 2, the output PWM waveforms may be filtered to obtain a more sinusoidal waveform. The filtered waveform may be stepped up by a step-up transformer and this waveform may then be conveyed by a transmission line to the input terminals of the ESP motor.

The voltage waveforms output by inverter 330 are monitored and a current module 360 determines the current, which is provided to the motor controller. Alternatively, a separate current monitor may be used to provide a measurement of the current to the motor controller. A motor speed module 370 is also coupled to monitor the output of the drive. This module determines the speed of the motor and provides this as another input to motor controller 350. A user interface 340 is also coupled to motor controller 350 in order to enable a technician or other user to input information relating to the electrical network.

Motor controller 350 uses the information provided by the user to model the electrical network. The model is then used by motor controller 350 with the real-time motor current and motor speed data to generate adjustments to the output power generated by inverter 330 to achieve the desired operation of the ESP motor.

Figure 4:
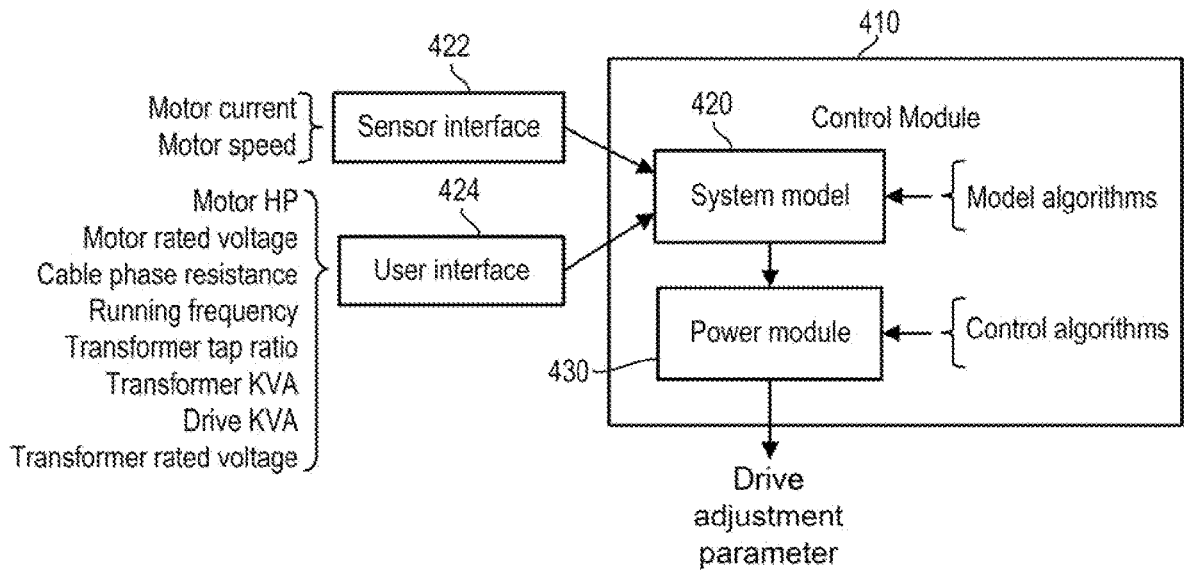
FIG. 4 is a diagram illustrating an example of a control module that can be implemented in the motor controller to generate an adjustment to the output power in accordance with some embodiments.

Referring to FIG. 4, a diagram is provided to illustrate an example of a control module that can be implemented in the motor controller to generate an adjustment to the output power in accordance with some embodiments. In this example, the motor controller has a control module 410 which is executed to generate the output power adjustment. The control module includes a system model 420 and a power module 430. System model 420 is configured to model the effects of the electrical network using various parameters that are defined by user input. These effects are also impacted by operating conditions which are monitored by corresponding sensors and input to the model (e.g., through interface 424). The system model uses a set of model algorithms to model the behavior of the electrical network based on the input parameters. The resulting information is provided to a power module which uses a corresponding set of control algorithms to generate a drive adjustment parameter which is used to control the output power generated by the drive system.

In some embodiments, the control module implements a field oriented control system in which the sinusoidal currents of the system are transformed to a reference frame in which they can be represented as two orthogonal components. This is sometimes referred to as a dq reference frame, referring to a direct axis and a quadrature axis. "d" and "q" subscripts below denote the direct-axis and quadrature-axis components of the current signals. In one embodiment, the adjustment parameter generated by the control module is a direct-axis current setting which is used to control the generation of output power by the electric drive.

A user interface 424 is coupled to system model 420 to enable a technician or other user to input the relevant system information. Using this information, the system can generate parameters which are needed to model the system. In one embodiment, the user provides inputs for the motor horsepower, motor voltage (phase-phase Vrms), surface phase-phase resistance (Q), step-up transformer ratio (Vs/Vp), transformer kilovolt-amp rating (kVA), drive kilovolt-amp rating (kVA), and transformer primary rated voltage (V). Some embodiments are configured to enable the motor voltage to be selected from a list of possible voltages. Alternatively, the voltage may be explicitly entered by the user.

Some permanent magnet motors use a linear design in which power increases as a function of length while maintaining substantially the same performance. Motor parameters such as inductances, back-EMF, motor current, and the like can therefore be extrapolated to any motor size from the known parameters of another motor. In some embodiments, this is used to scale some of the motor parameters from a baseline motor. These parameters may include, for example, motor horsepower, voltage, amperage, inductance, back-EMF, net iron length, average turns of magnet wire per slot, volts per turn of magnet wire, and efficiency power factor.

In an exemplary embodiment, the motor parameters for the model can be calculated from baseline values as follows (where HP_in is the motor horsepower, $Volts_{in}$ is the motor voltage, $EPF_{BL}$ is the baseline efficiency power factor, Ohms_in is the surface phase-to-phase resistance, VTL_BL is the baseline volts per turn, L_BL is the baseline net iron length, HP_BL is the baseline motor horsepower, Ld is the direct inductance, Lq is the quadrature inductance, Ld_BL is the baseline direct inductance, Lq_BL is the baseline quadrature inductance, kW is the motor kilowatts, MtrAmps is the motor nominal amperage, Rs is the motor armature resistance, TpS is the average turns per slot, TpS_BL is the baseline turns per slot, BEMF is the back EMF, BEMF_BL is the baseline back EMF, Max.Mtr.Volt is the maximum motor voltage, $TR_{in}$ is the step-up transformer ratio, and Rec.Tap.Setting is the recommended tap setting):

Motor Kilowatts (kW):

kW=0.74569987*HP_in

Motor Nominal Amperage (MtrAmps):

$$MtrAmps = \frac{HP_{in} * 745.69987}{\sqrt{3} * Volts_{in} * EPF_{BL}}$$

Motor Armature Resistance (Rs):

$$Rs = \frac{Ohms\_in}{2}$$

Average Turns per Slot (TpS):

$$\langle TpS \rangle = \frac{Volts\_in}{VTL\_BL * L\_BL * \left(\frac{HP\_in}{HP\_BL}\right)}$$

Ld Inductance (mH):

$$L_d = Ld\_BL * \left(\frac{\langle TpS \rangle}{TpS\_BL}\right)^2 * \frac{HP\_in}{HP\_BL}$$

Lq Inductance (mH):

$$L_q = Lq\_BL * \left(\frac{\langle TpS \rangle}{TpS\_BL}\right)^2 * \frac{HP\_in}{HP\_BL}$$

Back EMF:

$$BEMF = BEMF\_BL * \frac{HP\_in}{HP\_BL} * \frac{\langle TpS \rangle}{TpS\_BL}$$

Maximum Motor Voltage:

$$\text{Max. Mtr. Volt} = \frac{\text{Volts}_{in}}{TR_{in}} * \frac{E1 - 04}{120}$$

Recommended Tap Setting:

$$Rec.Tap. \text{ Setting} = \frac{\text{Volts\_in} + \left(\frac{\text{Ohms\_in}}{2}\right) \cdot MtrAmps}{440} * 480 =$$
$$1.103 * \left(\text{Volts\_in} + \left(\frac{\text{Ohms\_in}}{2}\right) \cdot MtrAmps\right)$$

In some embodiments, the control module is configured to set preprogrammed values based on a user's selection of a particular drive rating. The drive rating may be selected as a specific value, or as a range of values. The control module may therefore store a lookup table of values that correspond to each possible drive rating. In one embodiment, the defined capacitance and inductance values for the electrical network filter which is used with the selected drive rating. The table of values may also include a field corresponding to the transformer impedance that is used with a particular drive rating or range of drive ratings.

Thus, when a user provides an input selecting a particular drive rating, the control module accesses the table of values and retrieves the corresponding values for the filter inductance and capacitance, as well as the transformer impedance. The control module may alternatively be configured to enable the user to input specific values for the filter inductance, filter capacitance, and/or transformer impedance which override the values provided in the lookup table.

After the transformer impedance is determined, the control module in one embodiment computes a number of additional transformer parameters, including the following.

Transformer Impedance value:

Zperc=Z/100

Per Phase Xmer Primary Input Voltage:

Vinp_xmer=Vr_xmer/sqrt(3)

Transformer Rated Current:

Ir_xmer=KVA_xmer*1000/(3*Vinp_xmer)

Transformer Magnetizing Current:

Iex=pIex*Ir_xmer*exp(-1i*pi/2)

where "1i" stands for the complex number "i".

Transformer Base-Impedance Value:

Zb=sqrt(3)*Vr_xmer^2/(KVA_xmer*1000)

Angular Frequency (rad/s):

w_xmer=2*pi*fi;

where the frequency (fi) may be sensed at the output of the drive. The angular frequency is likewise determined based on the frequency sensed at the output of the drive:

wi=2*pi*fi

Transformer Magnetizing Reactance (ohms):

ZM=Vinp_xmer/abs(Iex)

Transformer Magnetizing Inductance (H):

LM=ZW/w_xmer

Transformer Leakage Reactance (Ohms)

Zxmer=Zperc*Zb

Transformer Leakage Inductance (H):

Lxmer=Zxmer/w_xmer

Transformer Phase Resistance (ohms):

Rxmer=0.01*Zb

The control module then computes a number of motor parameters, including the following.

Motor Power:

KW_mtr=0.74569987*HP_mtr

Motor Rated Current Using Scaled Values:

MtrAmps=KW_mtr*1000/(sqrt(3)*V*EPF_BL)

Rotations Per Minute (Assuming A 4-Pole Motor):

rpm=f*30

Percentage of Target Current Equals the Percentage of Load:

Is=Id*MtrAmps

Phase Voltage as Function of Load:

Vp=(V*(fi/120)/sqrt(3))*(Id*0.135+0.865)

where the actual frequency (fi) may be sensed at the output of the drive.

Motor Current at the Primary Side at Full Load:

Isp=Is*tap

Voltage at the Transformer Primary:

Vp1=Vp/tap

Cable Resistance Reflected at the Primary:

rcp=rc/tap^2

Calculating the Current Through Transformer Magnetizing Inductance:

IM=(Vp1*exp(-1i*delta)+Isp*rcp)/(1i*wi*LM)

Calculations Through the Drive Filter:

xc=1/(wi*Cf);

Ic=(Vp1*exp(-1i*delta)+Isp*rcp+(Isp+IM)*(Rxmer+ 1i*wi*Lxmer))/(-1i*xc)

Drive (Inverter) Output Current:

Iinv=(Isp+Ic+IM)

Estimated Drive Output Voltage:

Vinv=Vp1*exp(-1i*delta)+Isp*rcp+(Isp+IM)*(Rxmer+1i*wi*Lf+1i*wi*Lxmer)

Drive Output Power Factor;

Theta_Inv=(angle(Iinv)−angle(Vinv))

Offset:

offset=20;

The control module then calculates the direct-axis current setting (i*d) as follows:

I*d=abs(Iinv)*sin(delta−Theta_Inv)*100/abs(MtrAmps*tap)+offset

Figure 5:
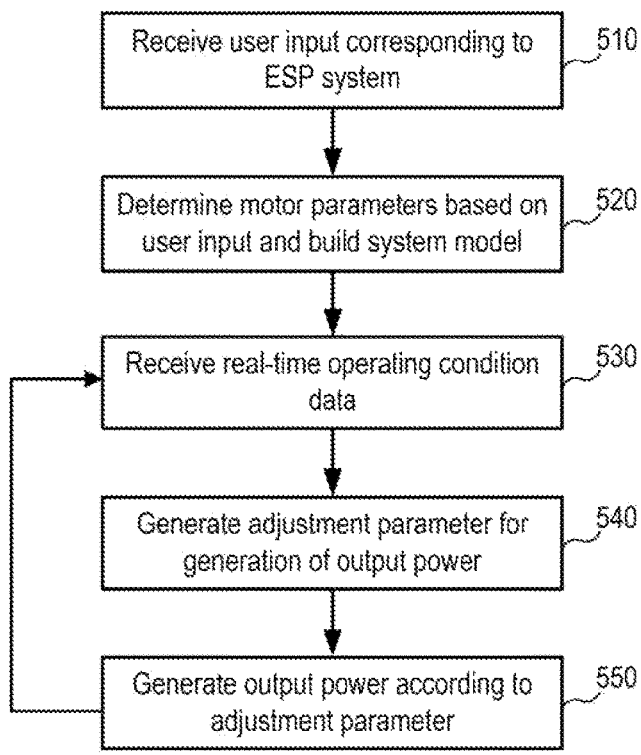
FIG. 5 is a flow diagram illustrating a method for adjusting the power output by an electric drive for an ESP system in accordance with some embodiments.

Referring to FIG. 5, a flow diagram shown to illustrate a method for adjusting the power output by an electric drive for an ESP system in accordance with some embodiments. This method begins with a control module of the ESP receiving information (e.g., as described above) from a user to define the system (step 510). The control module uses this information to determine various parameters of the system and builds a model of the system (step 520).

The control module then receives real-time input indicating current operating conditions of the system (e.g., motor speed and motor current (step 530). The control module uses the real-time information in conjunction with the system model to generate a direct-axis current setting as an adjustment parameter for the power output of the electric drive (step 540). The electric drive then generates output power using the adjustment parameter (step 550). This process is repeated as needed to generate power as necessary to optimize the performance of the motor. In some embodiments, the process is repeated at scheduled intervals (e.g., between 0.5 and 1.0 seconds).

Figure 6:
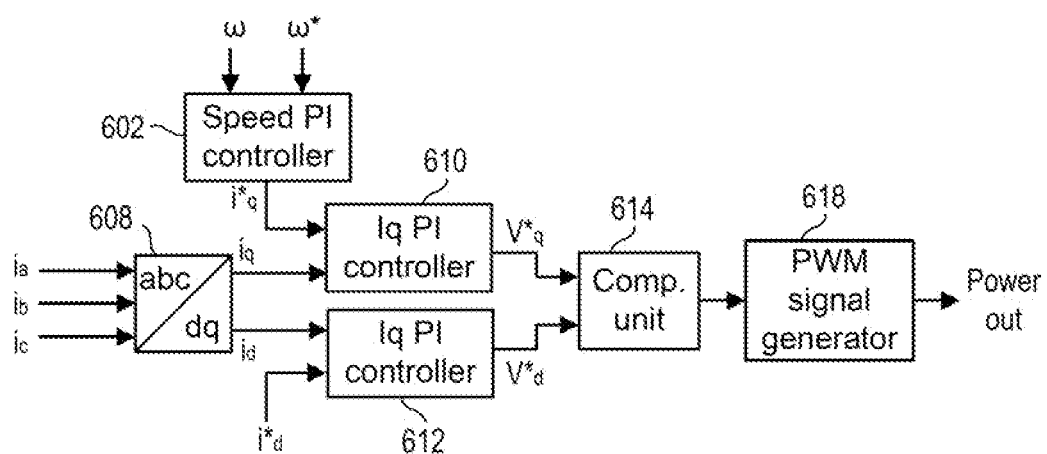
FIG. 6 is a functional block diagram illustrating the components of a field oriented control system for an electric drive unit in accordance with one embodiment.

Referring to FIG. 6, a functional block diagram illustrating the components of a field oriented control system for an electric drive unit in accordance with one embodiment is shown. In this embodiment, the controller of the electric drive implements a field oriented control algorithm, but alternative embodiments could be implemented in other types of control systems.

In this embodiment, currents $I_q$ and $I_d$ in the dq reference frame are generated by an abc-dq transformation unit 608 independence on the rotor position ($\theta_r$). Transformation unit 608 receives values of the currents measured on each of the phases in the a-b-c reference frame ($i_a$, $i_b$, $i_c$) and converts these values to currents $I_q$ and $I_d$ in the d-q reference frame using Clark and Park techniques. The $I_q$ and $I_d$ currents are provided to $I_q$ proportional integral (PI) controller 610 and $I_d$ PI controller 612, respectively.

In addition to $I_q$, PI controller 610 receives a value $I^*_q$ for a demanded quadrature-axis current. This value is generated by speed proportional integral (PI) controller 602 based on a reference rotor speed ($\omega^*$) and an actual rotor speed ($\omega$). Actual rotor speed w may be measured by a sensor coupled to the motor, or it may be estimated based on the current drawn by the motor. Based on the values of the computed quadrature-axis current ($I_q$) and the demanded quadrature-axis current ($I^*_q$), $I_q$ PI controller 610 generates a demanded quadrature voltage $V^*_q$.

As noted above, a direct-axis current $I_d$ generated by abc-dq transformation unit 608 is input to $I_d$ PI controller 612. $I_d$ PI controller 612 also receives as an input the direct-axis current setting $I^*_d$ generated by the control module. This value is used as a demanded direct current, which $I_d$ PI controller 612 uses to generate a demanded direct-axis voltage $V^*_d$. The demanded voltages generated by PI controllers 610 and 612 are input to a computation unit 614 that transforms these values to a modulation index suitable for input to PWM signal generator 618. The modulation index is provided to PWM signal generator 618, which generates a PWM signal that fires the switches of the drive's inverter to generate the PWM output waveform.

The preceding description of the disclosed embodiments is provided to enable any person skilled in the art to make or use the present invention. Various modifications to these embodiments will be readily apparent to those skilled in the art. For instance, the functions described above in connection with the motor controller may be distributed among one or more other components of the drive system. The generic principles defined herein may therefore be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the described embodiments. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the described embodiment.

What is claimed is:

1. A system for controlling an electric submersible pump (ESP) motor, the system comprising:
    an ESP having an electric motor;
    an electric drive adapted to generate AC output power to drive the electric motor; and
    an electrical network coupled between the electric drive and the electric motor, the electrical network including a filter, a transformer, and a transmission line;
    wherein the electric drive includes
        an output power generator adapted to receive external power from an external power source and to generate the AC output power from the received external power, and
        a drive controller adapted to:
            receive user input indicating one or more parameters of the ESP system, wherein the received user input comprises an identification of a motor parameter;
            retrieve a table of electrical network parameters;
            look up the identification of the motor parameter in the table;
            build a model of the electrical network based at least in part on the one or more parameters of the ESP system and the set of the electrical network parameters;
            receive real-time data indicating one or more current operating conditions of the electric motor;
            generate a power adjustment parameter based on the model of the electrical network and the received real-time data indicating the one or more current operating conditions of the electric motor; and
            provide the generated power adjustment parameter to the output power generator.

2. The system of claim 1, wherein the electric drive is installed at the surface of a well, and the ESP is installed downhole in the well.

3. The system of claim 1, wherein the drive controller further comprises an input interface adapted to receive user input defining one or more parameters of the electrical network.

4. The system of claim 3, further comprising one or more monitors adapted to monitor the one or more current operating conditions of the electric motor; generate the real time data indicating the one or more current operating conditions of the electric motor; and provide the generated real-time data indicating the one or more current operating conditions of the electric motor to the drive controller.

5. The system of claim 4, the one or more monitors comprising a current sensor adapted to measure a current at an output of the electric drive.

6. The system of claim 4, the one or more monitors comprising a motor speed sensor adapted to measure a speed of the electric motor.

7. The system of claim 1, wherein the drive controller comprises a field oriented control system.

8. The system of claim 7, wherein the power adjustment parameter comprises a direct-axis current setting.

9. The system of claim 1, further comprising a scheduler coupled to the drive controller, wherein the scheduler is adapted to cause the drive controller to recalculate the power adjustment parameter at scheduled intervals.

10. A method for generating output power to drive an ESP motor through an electrical network, the method comprising:

receiving, by a controller of an electric drive, user input corresponding to one or more parameters of an electric submersible pump (ESP) system in which an electric drive is coupled to an ESP motor through an electrical network including a filter and a transformer, wherein the received user input comprises an identification of a motor parameter;

retrieving a table of electrical network parameters;

looking up the identification of the motor parameter in the table;

generating, by the controller of the electric drive, a system model based on the received user input and the set of the electrical network parameters;

controlling, by the controller of the electric drive, the electric drive to generate output power;

applying, by the electric drive, the output power to the electrical network to drive the ESP motor;

sensing one or more operating conditions of the ESP motor;

receiving, by the controller of the electric drive, signals corresponding to the one or more real-time operating conditions of the ESP motor;

generating, by the controller of the electric drive, an adjustment parameter based on the system model and the signals corresponding to the one or more real-time operating conditions of the ESP motor; and controlling, by the controller of the electric drive, the electric drive to generate output power which is modified based on the adjustment parameter.

11. The method of claim 10, wherein sensing one or more operating conditions of the ESP motor comprises determining a motor speed of the ESP motor and determining a current drawn by the ESP motor.

12. The method of claim 10, wherein the controller of the electric drive comprises a field oriented control system, and wherein the power adjustment parameter comprises a direct-axis current setting.

* * * * *